No. 822,998. PATENTED JUNE 12, 1906.
H. W. SMITH.
BAND CUTTER AND FEEDER.
APPLICATION FILED APR. 4, 1905.
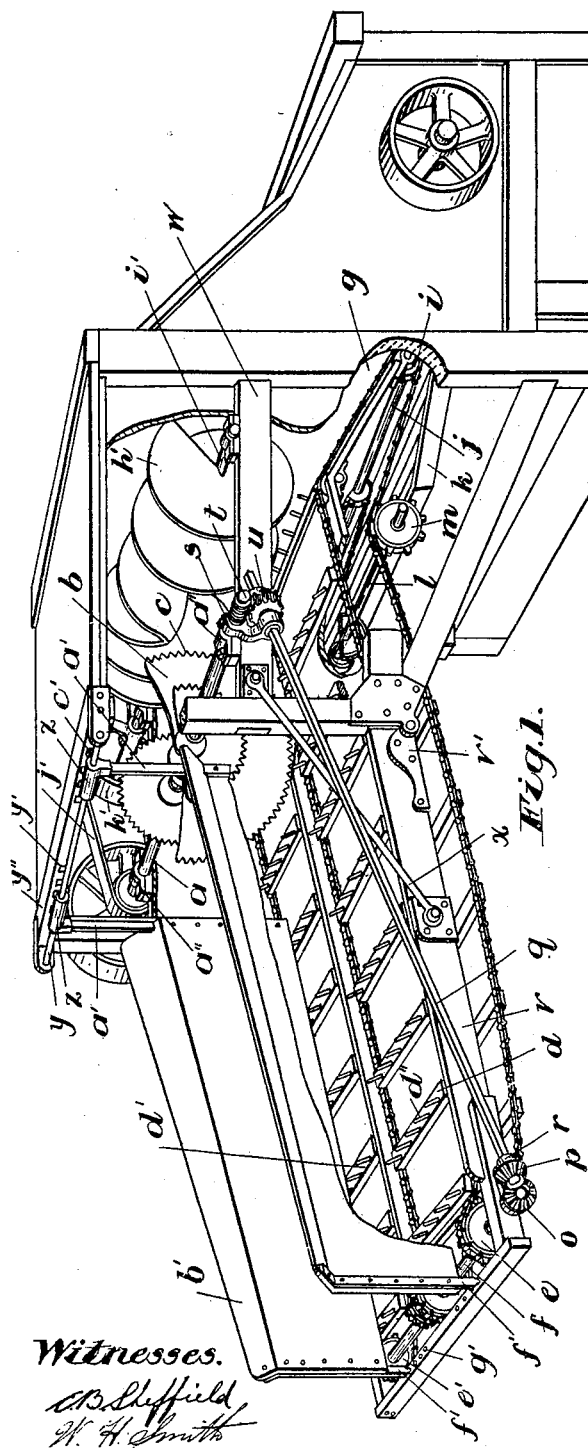
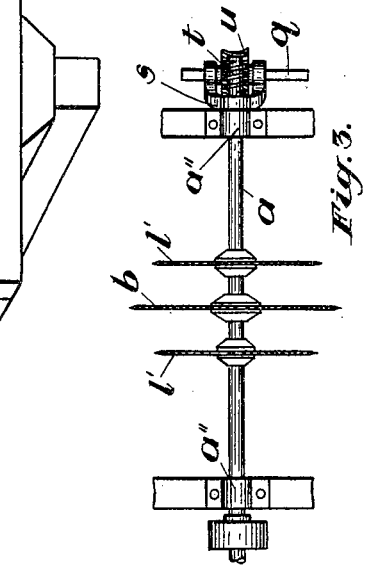
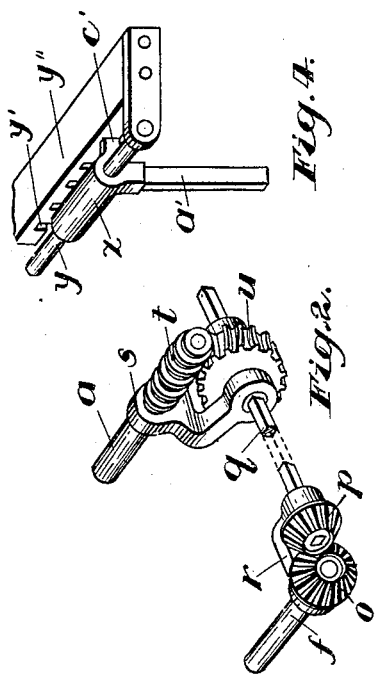
Witnesses.
C. B. Sheffield
W. H. Smith
Inventor.
Harry W. Smith
by C. H. Riches
his Attorney

UNITED STATES PATENT OFFICE.

HARRY W. SMITH, OF RENFORTH, CANADA.

BAND-CUTTER AND FEEDER.

No. 822,998.   Specification of Letters Patent.   Patented June 12, 1906.

Application filed April 4, 1905. Serial No. 253,872.

*To all whom it may concern:*

Be it known that I, HARRY W. SMITH, of Renforth, in the county of Wentworth and Province of Ontario, Canada, have invented certain new and useful Improvements in Band-Cutters and Feeders; and I hereby declare that the following is a full, clear, and exact description of the same.

This invention relates to a threshing-machine comprising in its construction a feeder mechanism consisting of two or more carrier-sections and motion-transmitting means to cause the carrier-sections to travel at different speeds, a band-cutter to sever the band at one or both sides of the sheaf and separate the sheaf into several sections corresponding in number to the carrier-sections, so that the latter may convey the sheaf-sections in succession to the cylinder, a spreader mechanism to engage the straw after the sheaf passes the band-cutter and distribute it over the carrier-sections, an actuating mechanism for the carrier-sections, band-cutter, and spreader, and adjustable side boards for the feeder-platform, as hereinafter more fully set forth and more particularly pointed out in the claims.

For a full understanding of the invention reference is to be had to the following description and to the accompanying drawings, in which—

Figure 1 is a perspective view of a complete apparatus with the casing partly broken away to show the construction and arrangement of one means by which the invention may be carried into practice. Fig. 2 is a perspective view showing the bearings for the shaft which transmits motion to the carrier-sections drive-shaft. Fig. 3 is a plan view of the band-cutter shaft, showing three band-cutting blades mounted upon it; and Fig. 4 is a view of one of the side-board hanger-supports.

Like letters of reference refer to like parts throughout the specification and drawings.

The band-cutter shaft $a$ is mounted to revolve in bearings $a''$, supported by the feeder-frame $w$, and driven, preferably, from the cylinder of the threshing-machine at a comparatively high rate of speed, so that the band-cutter $b$, mounted on and revoluble with it, will sever the bands as it comes into contact with them. The band-cutter $b$ is preferably of such a diameter that it will extend completely through and sever the band on both sides of the sheaf during its revolution and separate the sheaf into two sheaf-sections, so that one section may fall upon the right side of the band-cutter and the other upon the left, to be carried, respectively, by the carrier-rake sections $d$ and $d'$. Motion is transmitted to the carrier-rake sections $d$ and $d'$ by sprocket-wheels $e$ and $e'$, mounted upon the sprocket-wheel shaft $f$, which is preferably driven from the band-cutter shaft $a$, as hereinafter described.

The sprocket-wheels $e$ and $e'$ revolve in unison with the sprocket-wheel shaft $f$, but are of different diameters to drive the carrier-rake sections $d$ and $d'$ at different speeds, so that one section will travel faster than the other to deliver to the cylinder the sheaf-section carried by it in advance of the sheaf-section delivered by the other carrier-rake section. The rake-teeth $d''$ have a rearward inclination, and the sheaf when placed upon the carrier-rakes is engaged by the rake-teeth of the slower-moving section $d'$ and carried toward the band-cutter $b$, assisted by the faster-moving section $d$, the teeth of which engage the sheaf as they move past it and accelerate its speed over the speed of the slower-moving section. When the band is properly positioned, it is engaged by the band-cutter $b$ and severed, preferably, on both sides of the sheaf, so that one of the sheaf-sections will fall upon one of the carrier-rake sections and the other sheaf-section will fall upon the other carrier-rake section, which after the band is severed carry the sheaf-section at different speeds toward the cylinder.

The carrier-rake section $d$, traveling at a higher rate of speed than the carrier-rake section $d'$, will deliver its load to the cylinder $g$ in advance of the load carried by the carrier-rake section $d'$ to avoid overtaxing the capacity of the cylinder $g$, so that the beaters or decks will be enabled to properly perform the function of separating the grain from the straw without straining the operating parts of the apparatus or decreasing the speed of the same, the delivery to the cylinder of the contents of the carrier-rake section $d$ being followed by the delivery of the contents of the carrier-rake section $d'$. The carrier-rake sections $d$ and $d'$ at the opposite end of the sprocket-wheel shaft $f$ are revoluble around the sprocket-wheel idlers $i$, mounted upon the idler-shaft $j$, journaled in the feeder-frame $w$ above the grain-pan $k$, and mounted upon the shaker-shaft $l$ for the grain-pan $k$ are sprocket-wheel idlers $m$ to support the carrier-rake belts $o''$ as they return to the driving sprocket-wheels $e$ and $e'$.

Mounted on one end of the sprocket-wheel shaft $f$ is a bevel gear-wheel $o$, with which meshes a corresponding bevel gear-wheel $p$, mounted on the shaft $q$, the adjacent end of which is journaled in a bearing $r$, revolubly suspended from the sprocket-wheel shaft $f$. The opposite end of the shaft $q$ is journaled in a bearing $s$, revolubly suspended from the band-cutter shaft $a$, and mounted upon the band-cutter shaft $a$ is a worm $t$, meshing with a worm-wheel $u$, revoluble with and mounted on the shaft $q$ between the bearings $s$ and worm $t$. The shaft $q$ is preferably rectangular in cross-section except where it is engaged by the bearings $r$ and $s$ and is longitudinally movable through the worm-wheel $u$ for the purpose hereinafter expressed. The sprocket-wheel shaft $f$ is journaled in the outer end of the feeder-platform $v$, and the inner end of the feeder-platform is foldably connected by hinge members $v'$ to the feeder-frame $w$. By having the shaft $q$ journaled in the bearings $r$ and $s$, revolubly mounted, respectively, upon the sprocket-wheel shaft and the band-cutter shaft, and by arranging the pitman to move longitudinally through the worm-wheel it is unnecessary to detach the shaft $q$ and those portions of the driving-gear mechanism carried by it when moving the feeder-platform between its folded and extended positions, as the shaft $q$ will automatically adjust itself to the variations in the distance between the band-cutter shaft and sprocket-wheel shaft and the bearings for it will automatically adjust themselves to the variations of the inclination of the feeder-platform to the band-cutter shaft. When the feeder-platform is in its extended position, it is braced by suitable stays $x$, connected to the feeder-frame $w$ and to the platform sides intermediate their inner and outer ends.

Attached to the front of the feeder-frame $w$ is a supporting-bar $y$, upon which are adjustably mounted the hubs $z$ of the supporting-arms $a'$ for the side boards $b'$, the hubs $z$ having rearwardly-projecting lugs $c'$ arranged to enter corresponding grooves or notches $y'$ in the lower edge of the top $y''$ of the feeder-frame $w$ to maintain them in their adjusted position on the supporting-bar. By raising the front ends of the side boards the lugs $c'$ are lowered out of engagement with the grooves or notches to permit of the inner ends of the side boards being moved laterally in either direction upon the supporting-bar when adjusting them relatively to each other. The front end of the side boards $b'$ are provided with detent-bolts $f'$ to enter bolt-apertures $g'$ in the feeder-platform $v$. By adjustably supporting the side boards $b'$ from the supporting-bar $y$ and providing them with the detent-bolts $f'$ to enter the bolt-apertures $g'$ it is possible to readily adjust the side boards to the size of the sheaves entering the apparatus, and by employing the lugs $c'$ or other suitable fastening devices for the hubs $z$ it is possible to securely hold the inner ends of the side boards in their adjusted position, the outer ends of the side boards being held in their adjusted position by the detent-bolts $f'$ when contained in the bolt-apertures $g'$. The edge of the band-cutter $b$ preferably revolves within the space between the carrier-rake sections $d$ and $d'$ and below the plane of their top surface to effectively sever the bands and separate the sheaf-sections and cause the sheaf-sections to fall upon their respective carrier-rake sections to be carried forward by them at different speeds after the band is severed. If the carrier-rake consists of more than two sections, a corresponding number of band-cutters similar to the band-cutter $b$ will be mounted upon the band-cutter shaft $a$ to revolve in the intervals between the carrier-rake sections, and to further insure the cutting of the bands smaller band-cutting disks $l'$, as shown in Fig. 3, may be mounted upon the band-cutter shaft $a$ to revolve on opposite sides of the band-cutter $b$. The sheaf-sections after passing the band-cutter are engaged by spreader-screws $h'$, mounted on a shaft $i'$, driven, preferably, from the band-cutter shaft $a$ by a belt $j'$ and drive-pulleys $k'$. The spreader-screws open out the straw of the sheaf-sections and distribute it laterally as equally as possible over the whole surface of the carrier-rake.

Having thus fully described my invention, what I claim as new, and desire to secure by Letters Patent, is—

1. A feeder mechanism for threshing-machines comprising two or more carrier-sections of equal length moving in parallel planes, means for operatively causing one of said sections to move at a higher rate of speed than the other section or sections, a band-cutter opposed to the carrier-sections and located between the ends thereof so that it will cause the sheaf-sections to fall respectively on the slower and faster moving carrier-sections coincident with the cutting of the band.

2. A feeder mechanism for threshing-machines comprising two or more carrier-sections of equal length moving in parallel planes, means for operatively causing one of said sections to move at a higher rate of speed than the other section or sections, a band-cutter opposed to the carrier-sections, and located between the ends thereof so that it will cause the sheaf-sections to fall respectively on the slower and faster moving carrier-sections coincident with the cutting of the band and a straw-spreader to spread the sheaf-sections on the carrier-sections after passing the band-cutter.

3. A feeder mechanism for a threshing-machine comprising a feeder-platform, laterally-adjustable side boards therefor, hangers connected to the inner ends of the side boards, hubs for the hangers, a supporting-bar extending through said hubs, fingers for said hubs a feeder-frame and notches in the feeder-frame to receive said fingers and lock the hubs in their adjusted position upon the supporting-bar.

4. A feeder mechanism for a threshing-machine comprising a feeder-platform, laterally-adjustable side boards therefor, hangers connected to the inner ends of the side boards, hubs for the hangers, a supporting-bar extending through said hubs, fingers for said hubs a feeder-frame notches in the feeder-frame to receive said fingers and lock the hubs in their adjusted position upon the supporting-bar, and means at the outer ends of the side boards to detachably fasten them to the outer end of the feeder-platform.

5. In a feeder mechanism for a threshing-machine the combination of the band-cutter shaft, a bearing revolubly suspended from the band-cutter shaft, a carrier drive-shaft, a bearing revolubly suspended therefrom, a connecting-shaft mounted in said bearings and longitudinally movable through the bearing suspended from the band-cutter shaft and intermeshing gear for transmitting motion from the band-cutter shaft to the connecting-shaft and other connecting-gear for transmitting motion from the connecting-shaft to the carrier drive-shaft.

Toronto, March 23, A. D. 1905.

HARRY W. SMITH.

In presence of—
C. H. RICHES,
L. F. BROCK.